US008368696B2

(12) United States Patent
Daly et al.

(10) Patent No.: US 8,368,696 B2
(45) Date of Patent: Feb. 5, 2013

(54) TEMPORAL PARALLAX INDUCED DISPLAY

(75) Inventors: Scott J. Daly, Kalama, WA (US); Chang Yuan, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 901 days.

(21) Appl. No.: 12/456,600

(22) Filed: Jun. 19, 2009

(65) Prior Publication Data
US 2010/0321388 A1    Dec. 23, 2010

(51) Int. Cl.
*G06T 15/20* (2006.01)

(52) U.S. Cl. ........ 345/427; 345/629; 345/630; 345/639; 345/640

(58) Field of Classification Search .................. None
See application file for complete search history.

(56) References Cited

U.S. PATENT DOCUMENTS

| | | | |
|---|---|---|---|
| 2,273,512 A | 2/1942 | Caldwell et al. |
| 4,006,291 A | 2/1977 | Imsand |
| 4,429,328 A | 1/1984 | Jones et al. |
| 4,528,587 A | 7/1985 | Jones et al. |
| 4,567,513 A | 1/1986 | Imsand |
| 4,723,159 A | 2/1988 | Imsand |
| 4,815,819 A | 3/1989 | Mayhew |
| 4,966,436 A | 10/1990 | Mayhew |
| 5,510,831 A | 4/1996 | Mayhew |
| 6,324,347 B1 | 11/2001 | Bacs, Jr. et al. |
| 7,054,478 B2 * | 5/2006 | Harman ........................ 382/154 |
| 7,340,094 B2 | 3/2008 | Mayhew et al. |

FOREIGN PATENT DOCUMENTS

| | | |
|---|---|---|
| EP | 0597629 | 1/1999 |
| JP | 2005-229560 | 8/2005 |
| JP | 2008-153805 | 7/2008 |
| WO | WO9402875 | 5/1994 |

OTHER PUBLICATIONS

Janusz Konrad, "View Reconstruction for 3-D Video Entertainment: Issues, Algorithms and Applications", Jul. 1999, Image Processing and Its Applications, 1999. Seventh International Conference on (Conf. Publ. No. 465), vol. 1, pp. 8-12.*

K. Myszkowski, P. Rokita, and T. Tawara "Perceptually-informed accelerated rendering of high quality walkthrough sequences", 1999, $10^{th}$ Eurographics Workshop on Rendering, pp. 5-18.*

Scott Daly, "The Visible Differences Predictor: An Algorithm for the Assessment of Image Fidelity", 1993, MIT Press Cambridge, MA, in the book "Digital images and human vision", pp. 179-206.*

Fender, D. and Julesz, B., "Extension of Panum's Fusional Area in Binocluarly Stabilized Vision", Journal of the Optical Socliety of America, vol. 57, No. 6, (Jun. 1967), pp. 819-830.

Hodges, L.F. and McAllister, D.F., "Stereo and Alternating-Pair Tecniques for Dsiplay of Computer-Generated Images", IEEE, (Sep. 1985), pp. 38-45.

Jones, E.R., "VISIDEP; Visual Image Depth Enhancement by Parallax Induction", SPIE, vol. 457, Advances in Display Technology IV, (Jan. 24-25, 1984), pp. 16-19.

(Continued)

*Primary Examiner* — Ulka Chauhan
*Assistant Examiner* — Robert Bader
(74) *Attorney, Agent, or Firm* — Chernoff Vilhauer McClung & Stenzel, LLP (57) ABSTRACT

A temporal parallax induced display includes the presentation of different views of a scene. The system likewise uses a model of the human visual system to modify the image to reduce the rocking artifacts.

33 Claims, 7 Drawing Sheets

OTHER PUBLICATIONS

McLauren, A.P., et al., "Advanced Alternating-Frame Technology (VISIDEP (TM)), and Three-Dimensional Remote Sensing", IEE Transactions on Geoscience and Remote Sensing, vol. 26, No. 4, (Jul. 1988), pp. 437-440.

Mayhew, C.A. and Mayhew, C.M., "Three-Dimensional Visualization of Geographical Terrain Data Using Temporal Parallax Difference Induction", (date unavailable).

Ogle, K.N., "Some Aspects of Stereoscopic Depth Perception", Journal of the Optical Society of America, vol. 57, No. 9, (Sep. 1967), pp. 1073-1081.

Hodges, L.F. and McAllister, D.F., *Stereo and Alternating-Pair Techniques for Display of Computer-Generated Images*, IEEE Xplore, (Sep. 1985) pp. 38-45.

Mayhew, C.A and Mayhew, C.M., *Three-dimensional visualization of geographical terrain data using temporal parallax difference induction*, one year prior to filing date.

McLauren, A.P., et al., *Advanced Alternating-Frame Technology (VISIDEP(TM)) and Three-Dimensional Remote Sensing*, IEEE Transactions on Geoscience and Remote Sensing, vol. 26, No. 4, (Jul. 1988), pp. 437-440.

International Search Report and Written Opinion dated Jul. 20, 2010 in co-pending International App. No. PCT/JP2010/056962, filed Apr. 14, 2010; pp. 1-6.

* cited by examiner

TEMPORAL PARALLAX INDUCED DISPLAY

CROSS-REFERENCE TO RELATED APPLICATIONS

Not applicable.

BACKGROUND OF THE INVENTION

The present invention relates generally to displays.

One technique to present an image that has a three dimensional appearance is to use a three dimensional display. One type of three dimensional display uses a liquid crystal display shutter glass worn by the viewer. The shutter glass may be controlled by an emitter and alternatively darken over one eye then the other in synchronization with the refresh rate of the screen. Unfortunately, many viewers do not prefer to wear glasses while viewing a display.

Another technique to display a three dimensional image to the viewer is using an autostereoscopic display. In general, an autostereoscopic display includes view dependent pixels, each of which may include different intensities and colors, based upon the viewing angle of the viewer. This viewing angle dependency may be achieved through a variety of different techniques, such as including a parallax barrier within the display. The result, without the use of special headgear or glasses being worn by the viewer, is that the viewer will perceive a different image with each eye. If the image data is controlled for each eye's viewing angle, the viewer will sense a three dimensional image. Unfortunately, incorporating a parallax barrier reduces the spatial resolution of the display and reduces brightness while adding additional manufacturing complexity to the display together with an increase in expense. Also, the cross talk between multiple overlapped views deteriorates the three dimensional viewing experience.

Another limitation for both types of stereoscopic displays is that in the home there can be an accommodation and vergence mis-match. This occurs because the eyes can be focused on the distance of the screen, yet can be converged to the apparent depth within the image. These differences can lead to eyestrain, headache, or nausea.

What is desired is a three dimensional type display that has no spatial resolution loss, no brightness reduction, without requiring the viewer to wear glasses, and does not cause accommodation and vergence mismatches.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
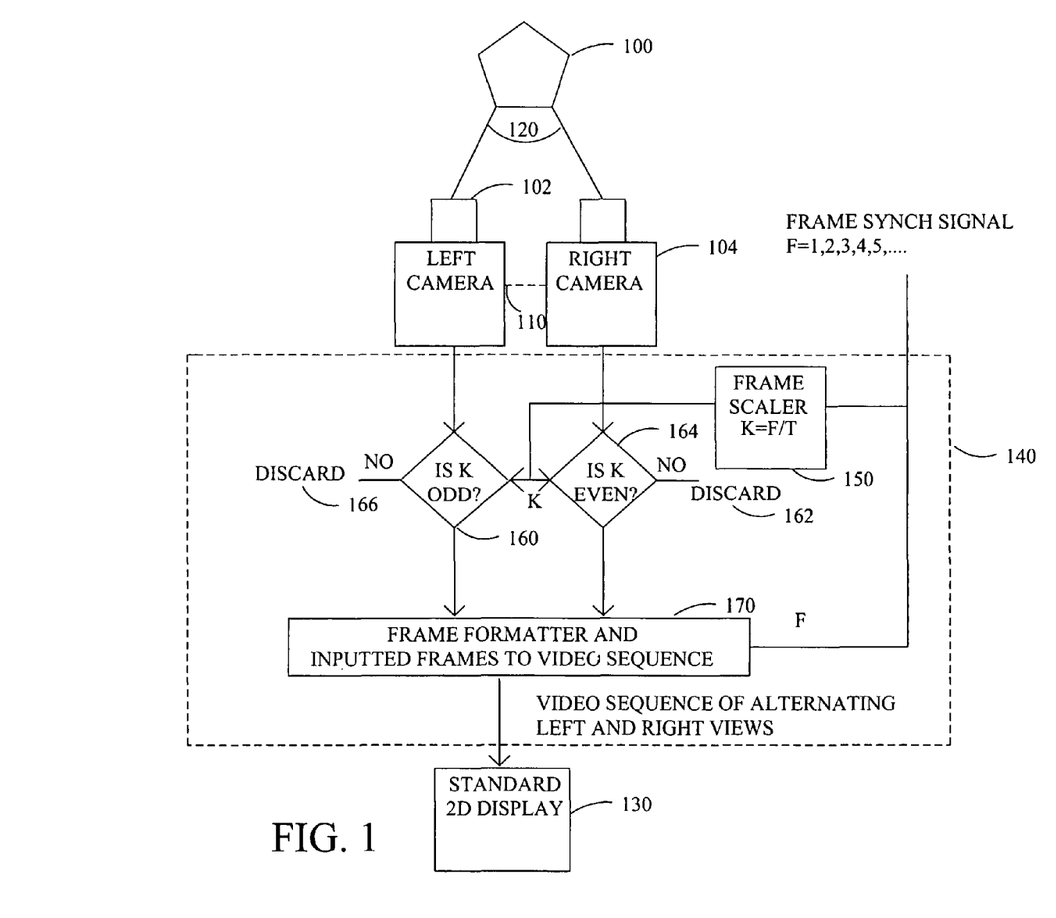
FIG. 1 illustrates a horizontal parallax system.

Referring to FIG. 1, one technique to achieve three dimensional characteristics on a flat two dimensional display, typically used for displaying two dimensional images, is to use a temporal parallax induction technique. The imaged object 100 is viewed by a pair of image capture devices 102, 104 offset from one another by an aperture distance 110 thereby defining a parallax angle 120. The captured images are displayed on a standard display 130 (i.e., not a stereoscopic display) alternating the different views in time by a sequencing process 140. The viewer's mind builds a mental three dimensional perception of the scene from these alternating views by reconstruction from his short-term memory.

Preferably the system receives the left and right images in alternating synchronization, each of which having the same format and pixel dimensions as the other. Alternatively, the system may receive the left and right images in synchronization. Depending on the sequence of the presentation, unnecessary images may be discarded and otherwise not presented to the viewer. In either case, the number of pixels presented by the left image is the same as the number of pixels presented by the right image, thus not requiring a display with an increase in the pixel density for three dimensional presentation over what is used for two dimensional presentation (or a subsequent loss of resolution relevant to the maximum display resolution). Preferably the image has substantially the same number of pixels as the display. The left image and right image are not necessarily images offset in only a horizontal direction, but rather, are indicative of a pair of images that are offset from one another in any direction relatively to the object, at any scale, format, or pixel dimensions.

The sequencing process 140 includes a frame scaler 150 that determines the rate that the left image and right image are switched relative to the overall frame rate. The alternating frequencies are preferably in the range of 4-8 hertz, so with a 60 frames per second (fps) video system, a 6 hertz alternating of views can be achieved by selecting five left image frames, followed by five right image frames, followed by five left image frames, and so on. The period, T, of the alternating sequence is 10 frames, given a 6 hertz oscillation. This technique, as can be observed, uses a traditional two dimensional display, so there is no additional cost incurred in the display technology to generate the perception of depth. Further, the vergence of the eyes and the accommodation are both at the display screen surface, so there is no mis-match.

The output of the frame scaler 150 is used to select between images from the left image and the right image. In the event K is odd 160, then the left image is selected and the right image is discarded 162. In the event K is even 164, then the right image is selected and the left image is discarded 166. In this manner, the desired number of images from the desired right images or left images is selected as a sequence. A frame formatter 170 receives the right image or left image, and arranges the right image or left image as a sequence of images for presentation to the display 130. In general, the offsets cause viewpoint parallax, and since it changes in time, it becomes a motion parallax.

Typically, in stereographic imaging, the right and left cameras are arranged from 15 degrees for an object at 0.3 meters, 4 degrees at 1.0 meter, and 0.87 degrees at 5 meters. Preferably for the temporal parallax induction technique of FIG. 1 the cameras are not placed at the typical distance of the eyes, but rather considerably closer, such as a parallax angle as low as 1 degree at 1.0 meter. The reason for such a small parallax is because with the temporal parallax induction technique there tends to cause a "rocking distortion" because the alternating views are different for different portions of the image. In general "rocking" artifacts/distortions refers to any such offsets in the images being presented. In essence, different portions of the object will tend to be observed to shift different distances between the left image and the right image. Large image shifts can not be fused by the visual system into a depth illusion, as given by data of boundaries in angular disparity and viewing distance referred to as Pannum's fusion area. If disparity fusion does not occur, then the result is two edges of a single object that flicker back and forth (i.e. the rocking distortion). This oscillation between the left image and the right image is very distracting to the viewer.

Figure 2:
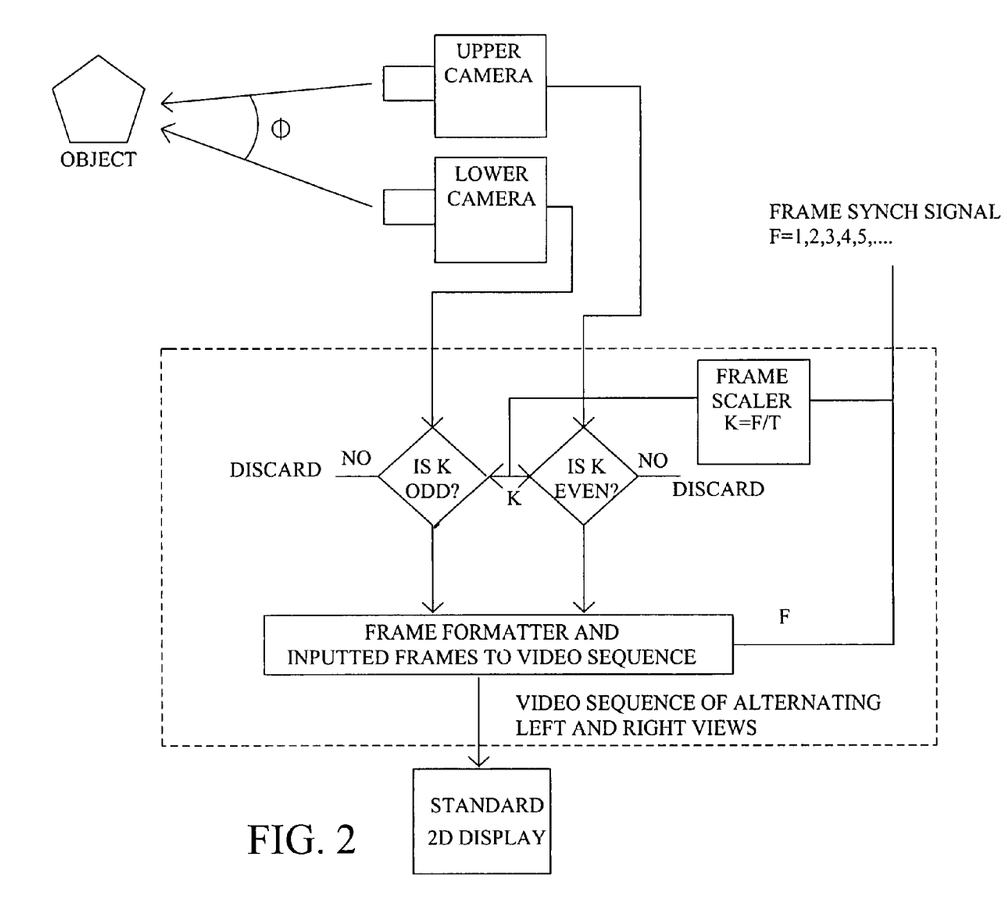
FIG. 2 illustrates a vertical parallax system.

Referring to FIG. 2, a modified technique uses cameras that are vertically offset, rather than horizontally offset. Having a vertical offset tends to reduce the rocking distortion viewed by the viewer.

Figure 3:
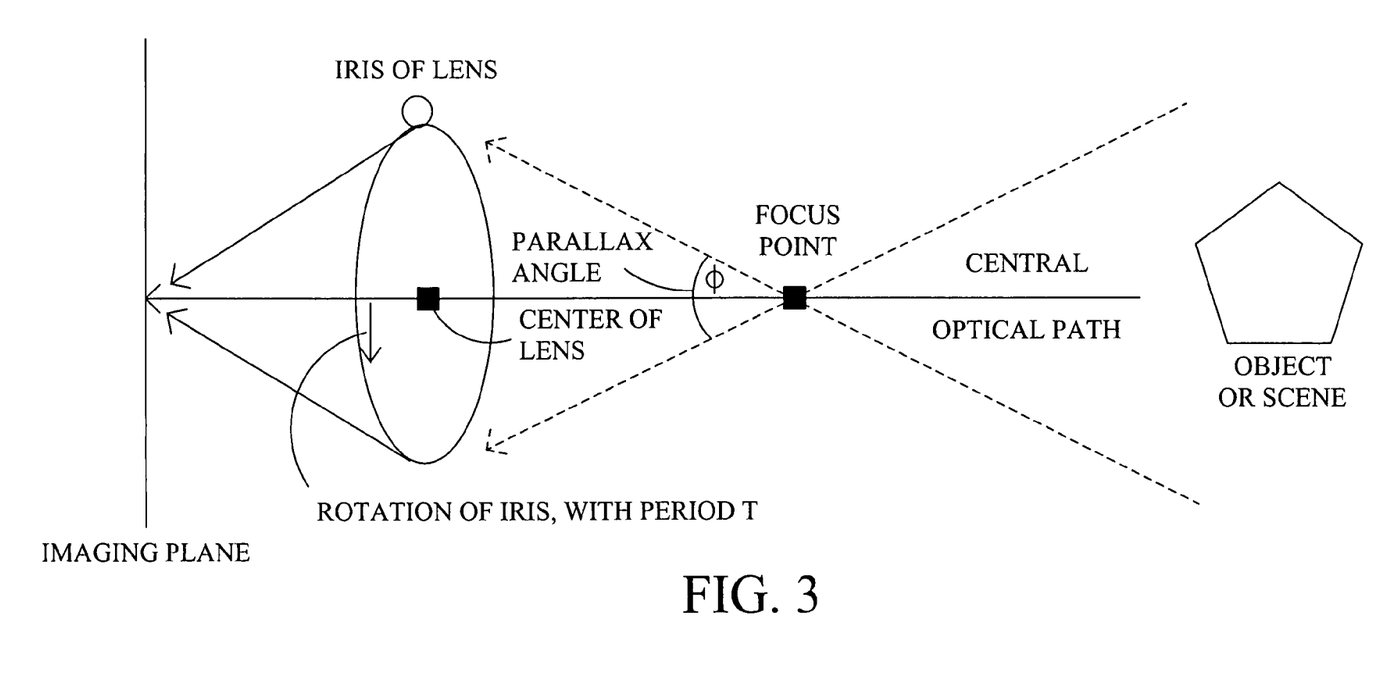
FIG. 3 illustrates an image capture technique using temporal parallax

Referring to FIG. 3, a further modified technique uses an image capture device that oscillates among a continuum of alternating views (or multiple views) as opposed to switching between just two views. This may be generally considered a sinusoidal or triangular position viewpoint as a function of time as opposed to a square wave as a function of time. In some cases, a system may use both horizontal parallax as well as vertical parallax. Moreover, the system may oscillate together with a combination of horizontal parallax and/or vertical parallax and/or random views.

One technique for two different parallax views to occur to the visual system is for the viewpoint to rotate while the head stays still. Since the head is generally still while viewing the temporal parallax induction imagery on a two dimensional display, one side effect of the inherent oscillation of the temporal parallax induction is that it looks like the object or scene is turning back and forth. Due to the common frequency rate used in this technique, it is similar to a rocking motion. This effect can be quite disturbing as it can cause the entire scene to rock back and forth in unison, and since it may be observed as a three dimensional image, the effect tends to be even stronger.

While the temporal parallax induction technique provides the appearance of depth for an image, it unfortunately tends to include some rocking distortions that may be undesirable to the viewer. The temporal parallax induction technique may include a filter based upon the human visual system to reduce the rocking distortions to a level that is less objectionable to the viewer or otherwise generally unnoticeable to the viewer. Thus the benefits of the temporal parallax induction technique may be achieved without the rocking distortion drawbacks associated with the technique. In general, any filter may be used based upon adaptively adjusting at least one of frequency and amplitude as a function of location.

To reduce the rocking distortions a visual model of the human visual system is used to remove, preferably a majority if not all, of the rocking distortions significantly above the visual threshold. In addition, the rocking distortions near the threshold or slightly above threshold of the human visual system are likewise significantly reduced or otherwise removed. The rocking distortions below or near the threshold of the human visual system are preferably not modified or otherwise not attenuated a temporal parallax depth impression remains to the viewer. In particular, the visual model may suppress the local spatial image differences (disparities from the views) between the different views of the scene. Preferably, the suppression is performed in the two-dimensional space (i.e., the image space that the image is actually displayed). Alternatively, the suppression may be performed in three dimensional space, if desired.

The source data may be in any format, any type of data compression, and represented by any desirable characteristics. For example, in the case of a pair of cameras the representation may be pairs of left images and right images. For example, particularly for computer generated graphics, the representation may be an image together with a depth map. In most cases, the depth map is at the same resolution as or lower than the image.

Figure 4:
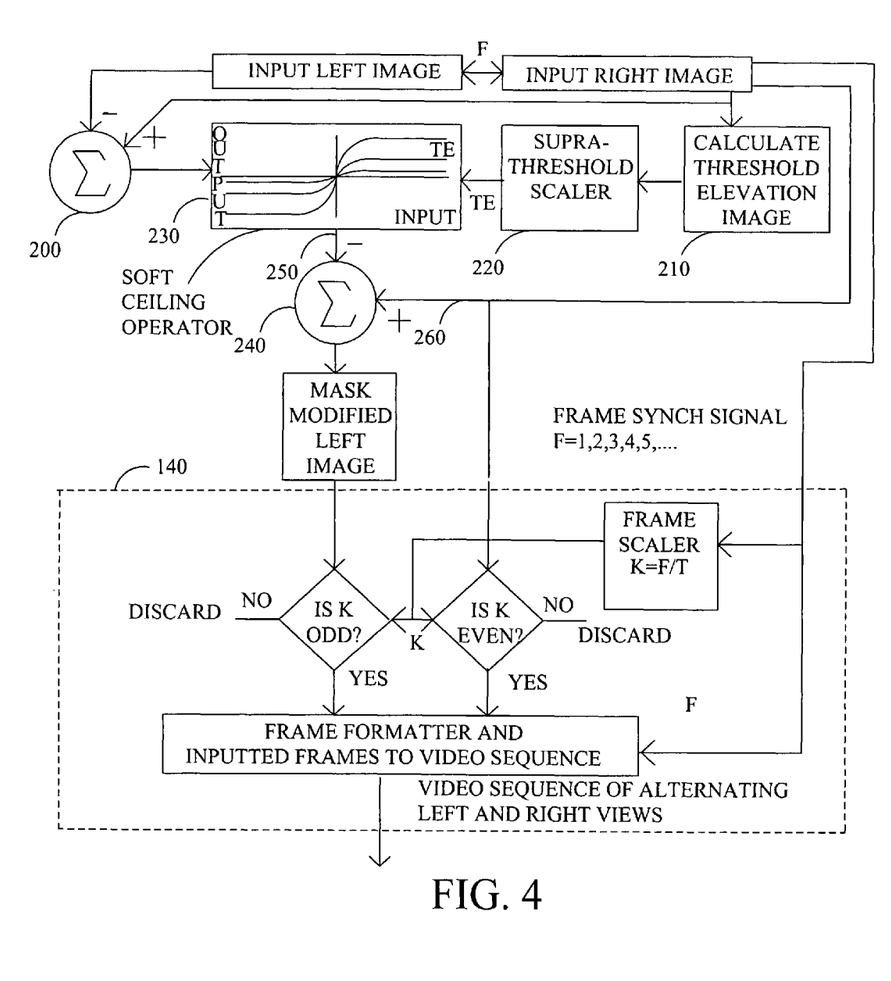
FIG. 4 illustrates a temporal parallax system to reduce rocking distortions and flicker from a stereo pair of images.

Referring to FIG. 4, a synchronized pair of a left image and a right image are received or otherwise a sequence of frames forming a video. Preferably, the left image and right image are synchronized at the same frame rate and phase. Initially, a difference 200 is determined between the left image and the right image. In general the difference will have a zero mean and will extend to a positive maximum value and to a negative maximum value. An offset may be added to adjust the values so that only positive values exist. The degree to which the viewer may observe rocking artifacts, which sometimes appears as double edges, in the image is generally related to the absolute value of the magnitude of the difference.

Due to the spatial and temporal frequency sensitivities of the human visual system, as well as masking properties of the human visual system, all of the difference image that is visible in isolation, or in a static image, will not be readily visible to the viewer. In other words, the visibility of these code values is not equal for equal differences in values. A model of the human visual system may be used to alter the difference image so that the differences that cause the rocking distortion are not readily visible to the viewer when viewed at the desired frame rates, or in the context of a static image. A threshold elevation image 210 is calculated which is based upon the human visual system, described in detail later. The output of the elevation image 210 is a map of the threshold elevation as a function of image position (threshold map or threshold elevation image). The threshold elevation image may operate on the left image, and/or right image, as desired (that is, for the input left image and the right image may be reversed). The values may be scaled 220 to permit additional just-noticeable differences above the threshold that may be allowed to appear in the image so to allow visually degrading the image to desired amounts. This allows a tradeoff in the strength of the depth illusion versus the visibility of the rocking distortion.

The output of the elevation image 210 is then processed by a soft-ceiling operator 230 which is preferably pixel dependent, which sets the maximum difference (ceiling) allowed as a function of position in the image (e.g., an absolute value maximum). It is referred to as a 'soft' operator because it uses a soft transition from allowing the image difference to be unaltered (slope of 1 as illustrated), to the region where it is clamped entirely (a slope of 0 as illustrated). The output of the soft ceiling operator is an image whose maximum differences are suppressed by the human visual system models of thresholds, so that the differences are all close to the threshold.

Next a modified left image 240 is made by adding the modified image difference 250 with a negative sign to the right image 260. At this point the system has a new left image and right image pair of images that are input to the sequence process 140 of the temporal parallax induction. While illustrated for a left image and right image pair, the technique likewise works for any set of temporal parallax pairs of images, no matter the source.

Figure 5:
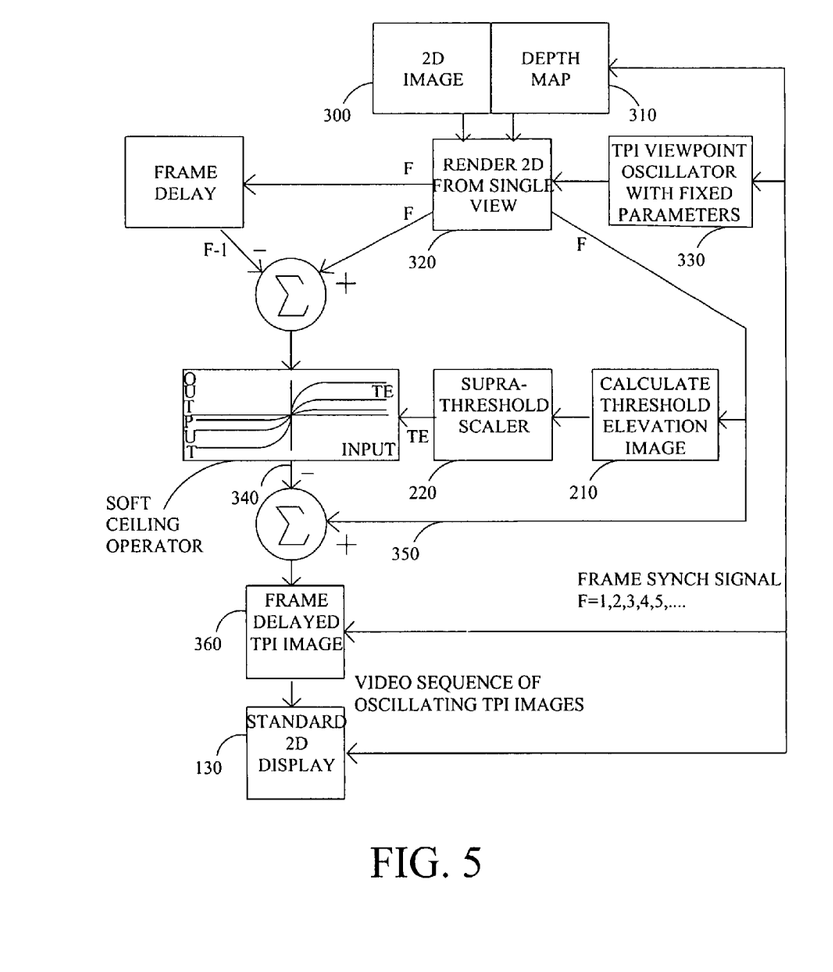
FIG. 5 illustrates a temporal parallax system to reduce rocking distortions and flicker from two dimensional images and a depth map.

Another modifying technique is illustrated in FIG. 5 using a two dimensional image 300 together with its depth image map 310. For simplification, the resolution of the two dimensional image and depth image may be presumed to be the same, or otherwise scaled to be the same. From the depth map and the two dimensional image, a new view 320 may be synthesized. While the single image and depth map may be used directly, using two two dimensional images plus a depth map helps with handling image occlusions. The system may synthesize new views to correspond to smoothly oscillating left image and right image, or vertical parallax angles, or combinations thereof. The oscillation pattern is controlled in 330. The fixed patterns include frequency, gain, and phase of the oscillation for the x,y axes, or a table controlling more random or otherwise complex patterns. Also, other oscillating patterns may be used such as a random pattern or a pattern that is image dependent. The output image from these sequential varying viewpoints is then saved in a frame buffer (in order to delay) and compared to the next frame (or previous frame) to form a difference image. The delay may need to be scaled by the frame scaler, K. The difference image is operated on by the soft ceiling operator whose amplitude, Te, is based on the human visual model to determine a threshold elevation image in step 210 from either the current or previous frame. The threshold image is also scaled by the desired threshold scaler for the same purpose as in FIG. 4. Next, the modified difference image base from the previous frame 340 is combined with the current frame 350 to generate a frame delayed temporal parallax induced image 360. These steps are preferably done at the frame rate, as indicated by the signal F. The new video sequence consists of a single image frame for each frame of the sequence, and can be consequently shown on a two dimensional display capable of showing video sequences. Depending on the supra threshold, scalar, and oscillation parameters, it may result in a two dimensional image that appears to have its depth enhanced.

Figure 6:
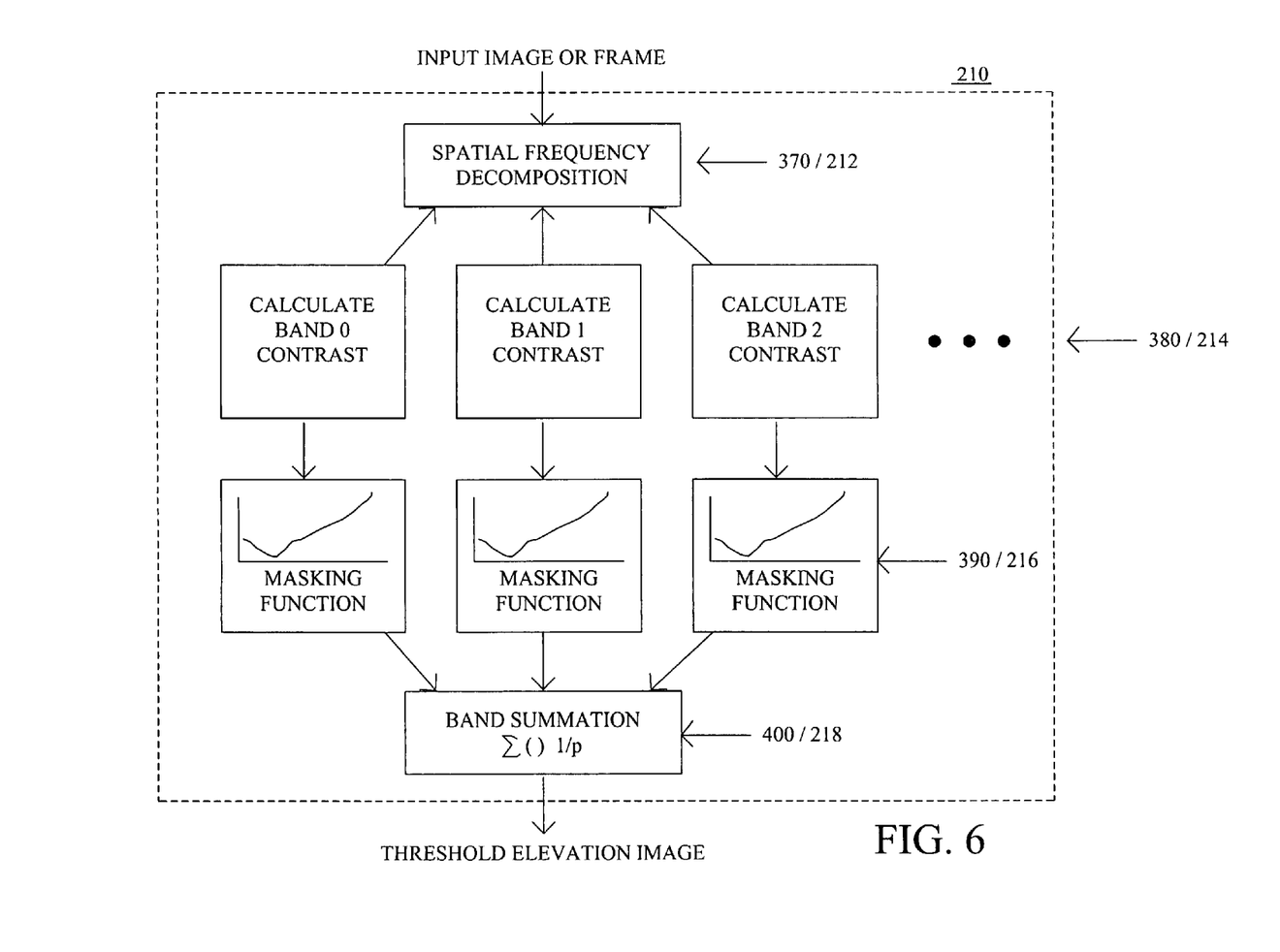
FIG. 6 illustrates calculation of a threshold elevation due to masking.

The elevation image 210 may be determined using any suitable technique. One such technique includes modeling the effects of the variability of the visual threshold as subject to the image content, often referred to as masking, as shown in FIG. 6. The first step is to take the input image and decompose it into different frequency bands 370. Any suitable decomposition technique that approximates the human visual system spatial frequency analysis may be used. Examples include, two dimensional Cartesian wavelet technique, Gaussian pyramid technique, cortex transform technique, steerable filter pyramid technique, and others. For each of these frequency bands, the contrast is calculated in a pixel-dependent manner in step 380. The technique may likewise be spatial in character, if desired. Next these contrast signals are used to generate a masking signal by known methods for each band and pixel position in step 390. Then, these masking signals are combined across the bands to generate a single threshold elevation image in step 400. The combination may be a Minkowski summation (terms raised to a power, p, then summed, then the sum subject to an inverse power function (1/p)). Other types of combinations may likewise be used. One technique for scaling the threshold map is to use a value of 1.0 for just at threshold elevation. In a simple implementation, a threshold can correspond to one gray level difference. Higher levels of threshold elevation, such as a value of 2.0, means the differences are two times the ordinary threshold will be allowed to remain in the image. Those higher than two would be generally suppressed to a difference of two. Similarly for other threshold elevation values that are greater than 1.0.

Figure 7:
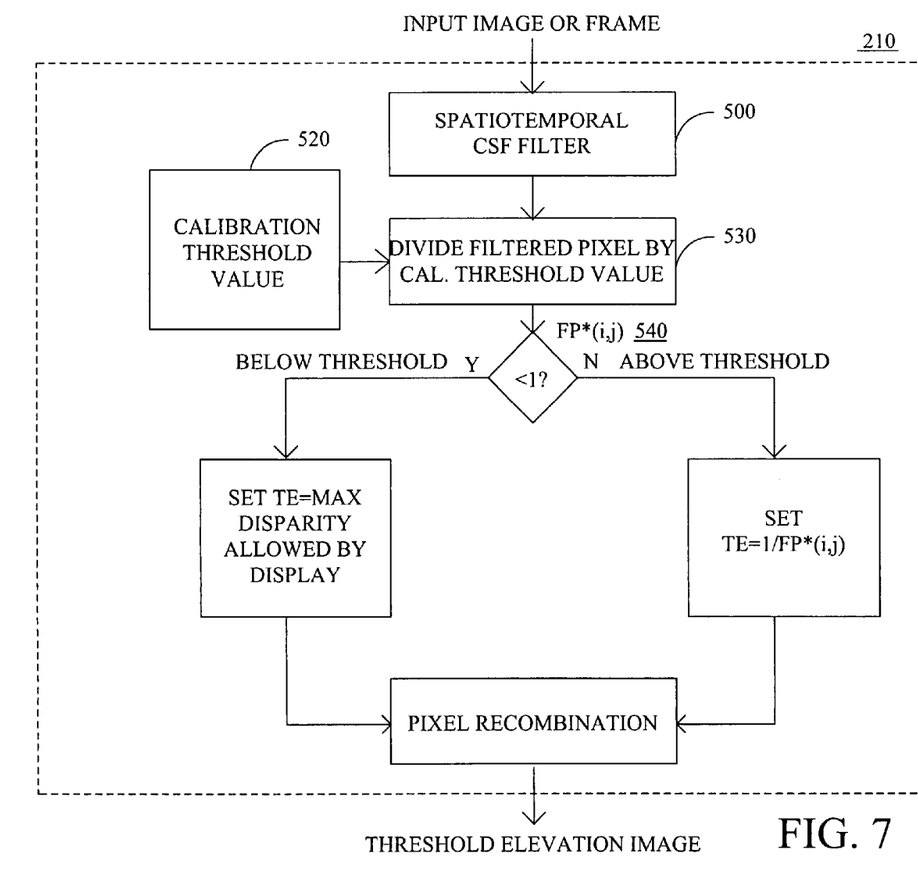
FIG. 7 illustrates calculation of a threshold elevation due to visual filtering.

Referring to FIG. 7, another technique includes calculating a threshold elevation map to focus on the retinal image capture limits of the visual system, which are primarily manifest in the contrast sensitivity function which describe visibility as a function of frequency. In particular, one may use a spatiotemporal contrast sensitivity function, which may be implemented as a filter. The first step is to apply a spatiotemporal filter (ST-CSF filter) 500 that has characteristics of the visual system, to give an image FP(i,j) 510. The imaging system and display may be calibrated in 520 to the visual threshold (using parameters like viewing distance, display contrast and tonescale). Since the ST-CSF has a zero DC response, the images become zero mean, and the pixel amplitudes are close to describing contrasts (this can be made more accurate by scaling by the mean of the image, or local mean). These contrasts are divided in 530 by the threshold giving an image FP*(i,j) 546. Next a comparator against 1 is used, on a per-pixel basis. If the division output is <1, then this means the difference image at that point is below threshold, and no modification of the difference image at that location is needed. The other branch path is that for the division output being >1, in which case the TE value is 1/division output (TE=1/FP*(i,j)). This will suppress it to the threshold value. Next the pixels from the two paths are combined in a manner based on which path they took, without interaction from each other in the combination step. Values higher than 1.0 may be used for the reasons as in step 220 in FIG. 5.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:
1. A system for presentation of image comprising:
(a) at least a pair of images of a scene from different viewpoints;
(b) selectively presenting images on a display from said different viewpoints such that a viewer observes said scene in a three dimensional manner without glasses for said viewer;
(c) wherein at least one of said images is modified based upon a filter that is based upon the human visual system in order to reduce rocking artifacts to a level less than they would otherwise have been had said filter not modified said at least one of said images;
(d) wherein said pair of is based upon a two dimensional image and a depth map;
(e) wherein said two dimensional image and depth map are used to render two dimensional views;
(f) wherein at least a pair of images from said two dimensional views are used for said selective presenting images on said display;
(g) wherein said selectively presenting is based upon a viewpoint selector;
(h) wherein a threshold elevation image is calculated based upon at least one of said two dimensional views;
(i) wherein said threshold elevation image is based upon a spatiotemporal filter;
(j) wherein said spatiotemporal filter includes a contrast sensitivity function;
(k) wherein said threshold elevation image uses a threshold to determine a filtered pixel value;
(l) wherein said threshold includes a disparity measure.
2. The system of claim 1 wherein said at least a pair of images are horizontally offset from one another.
3. The system of claim 1 wherein said at least a pair of images are vertically offset from one another.

4. The system of claim 1 wherein an offset of at least a pair of images is modified over time.

5. The system of claim 1 wherein an orientation of said viewpoints is random.

6. The system of claim 1 wherein said display has substantially the same number of pixels as the number of pixels of said at least one of said pair of images.

7. The system of claim 1 wherein said at least a pair of images are obtained from a pair of imaging devices having the same format and pixel dimensions.

8. The system of claim 1 wherein said at least a pair of images are obtained in synchronization.

9. The system of claim 1 wherein said selectively presenting said image is based upon a frame scaler that determines the rate that said images are displayed.

10. The system of claim 9 wherein said scaler is used to select between two viewpoints of images.

11. The system of claim 1 wherein said different viewpoint are less than 1 degree at 1.0 meter distance to object.

12. The system of claim 1 wherein said at least a pair of images are from a rotating viewpoint.

13. The system of claim 12 wherein said image capture device provides more than two different viewpoints.

14. The system of claim 1 wherein said rocking artifacts are reduced in one region of said image while not reduced in other regions of said image.

15. The system of claim 1 wherein said rocking artifacts are generally reduced to a level less than the visual threshold of the human visual system.

16. The system of claim 1 wherein said rocking artifacts are generally reduced to a level less than a threshold somewhat greater than the visual threshold of the human visual system.

17. The system of claim 1 wherein said rocking artifacts are generally reduced to a level approximately equally above the human threshold for substantially all of at least one of spatial regions and frequencies of said image.

18. The system of claim 1 wherein said rocking artifacts are reduced in the two-dimensional space of said at least one pair of images of said scene.

19. The system of claim 1 wherein said pair of images includes an image and a depth map.

20. The system of claim 1 wherein said filter includes a soft-ceiling operator.

21. The system of claim 1 wherein said filter is pixel dependent.

22. The system of claim 1 wherein said filter is based upon image decomposition into multiple frequency bands.

23. The system of claim 1 wherein said filter is based upon the contrast sensitivity function of the human visual system.

24. The system of claim 1 wherein a soft ceiling operator is based upon said threshold elevation image for said selectively presenting images on said display.

25. The system of claim 1 wherein said threshold elevation image is based upon a spatial frequency decomposition.

26. The system of claim 25 wherein said spatial frequency decomposition includes a contrast calculation.

27. The system of claim 25 wherein said spatial frequency decomposition includes a masking function calculation.

28. The system of claim 1 wherein said images are computer generated synthetic images.

29. The system of claim 23 wherein said contrast sensitivity function is based upon a spatial contrast sensitivity function.

30. The system of claim 23 wherein said contrast sensitivity function is based upon a spatiotemporal contrast sensitivity function.

31. A method of presenting an image on a display comprising:
(a) receiving at least a pair of images of a scene, where each of said images are from a different viewpoint;
(b) sequentially presenting said images on said display such that a viewer observes said scene in a three dimensional manner without glasses for said viewer;
(c) wherein at least one of said images is modified using a processor based upon a filter that adaptively adjusts at least one of frequency and amplitude as a function of location in order to reduce rocking artifacts to a level less than they would otherwise have been had said filter not modified said at least one of said images;
(d) wherein said pair of is based upon a two dimensional image and a depth map;
(e) wherein said two dimensional image and depth map are used to render two dimensional views;
(f) wherein at least a pair of images from said two dimensional views are used for said selective presenting images on said display;
(q) wherein said selectively presenting is based upon a viewpoint selector;
(h) wherein a threshold elevation image is calculated based upon at least one of said two dimensional views;
(i) wherein said threshold elevation image is based upon a spatiotemporal filter;
(j) wherein said spatiotemporal filter includes a contrast sensitivity function;
(k) wherein said threshold elevation image uses a threshold to determine a filtered pixel value;
(l) wherein said threshold includes a disparity measure.

32. A system for presentation of image on a display comprising:
(a) at least a pair of images of a scene where each of said images is obtained from a different viewpoint of said scene;
(b) selectively presenting said images on said display from said different viewpoints so that a viewer observes said scene displayed on said display in a three dimensional manner;
(c) said three dimensional manner is observed by said viewer without stereoscopic glasses;
(d) wherein at least one of said images is modified prior to being displayed on said display using a filter;
(e) said filter attenuating visible distortions between said images above a visual threshold to a greater extent than parallax distortions below said visual threshold;
(f) said filter is a spatial-temporal filter with low-pass characteristics in both spatial and temporal directions;
(g) wherein said pair of is based upon a two dimensional image and a depth map;
(h) wherein said two dimensional image and depth map are used to render two dimensional views;
(i) wherein a threshold elevation image is calculated based upon at least one of said two dimensional views;
(j) wherein said threshold elevation image uses a threshold to determine a filtered pixel value;
(k) wherein said threshold includes a disparity measure.

33. A system for presentation of image on a display comprising:
(a) at least a pair of images of a scene where each of said images is obtained from a different viewpoint of said scene;
(b) selectively presenting said images on said display from said different viewpoints so that a viewer observes said scene displayed on said display in a three dimensional manner;

(c) said three dimensional manner is observed by said viewer without stereoscopic glasses;
(d) wherein at least one of said images is modified prior to being displayed on said display using a human visual system model;
(e) said human visual system model includes a masking threshold where visible distortions between said images above the masking threshold to a greater extent than parallax distortions below said masking threshold;
(f) said masking threshold is applied with different values for each sub-image in a spatial filter bank of sub-images;
(g) wherein said pair of is based upon a two dimensional image and a depth map;
(h) wherein said two dimensional image and depth map are used to render two dimensional views;
(i) wherein a threshold elevation image is calculated based upon at least one of said two dimensional views;
(j) wherein said threshold elevation image uses a threshold to determine a filtered pixel value;
(k) wherein said threshold includes a disparity measure.

* * * * *

UNITED STATES PATENT AND TRADEMARK OFFICE
CERTIFICATE OF CORRECTION

PATENT NO. : 8,368,696 B2  Page 1 of 2
APPLICATION NO. : 12/456600
DATED : February 5, 2013
INVENTOR(S) : Scott J. Daly et al.

It is certified that error appears in the above-identified patent and that said Letters Patent is hereby corrected as shown below:

In the Claims

Col. 6, Line 37

Delete "selectively presenting images on a display" and insert --a display, on which images are selectively presented--;

Col. 6, Line 41

Delete "wherein at least one of said images is modified" and insert --a filter, which modifies at least one of said images--;

Col. 8, Line 14

After "pair of" insert --images--;

Col. 8, Line 37

Delete "selectively presenting said images on said display" and insert --a display, on which images are selectively presented--;

Col. 8, Line 43

Delete "wherein at least one of said images is modified" and insert --a filter, which modifies at least one of said images--;

Col. 8, Line 44

After "display" delete "using a filter";

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,368,696 B2

Col. 8, Line 50

After "said pair" insert --images--;

Col. 8, Line 61

Delete "selectively presenting said images on said display" and insert --a display, on which images are selectively presented--;

Col. 8, Line 64

Delete "selectively presenting said images on said display" and insert --a display, on which images are selectively presented--;

Col. 9, Line 3

Delete "wherein at least one of said images is modified" and insert --a filter, which modifies at least one of said images--;